Figure 6:
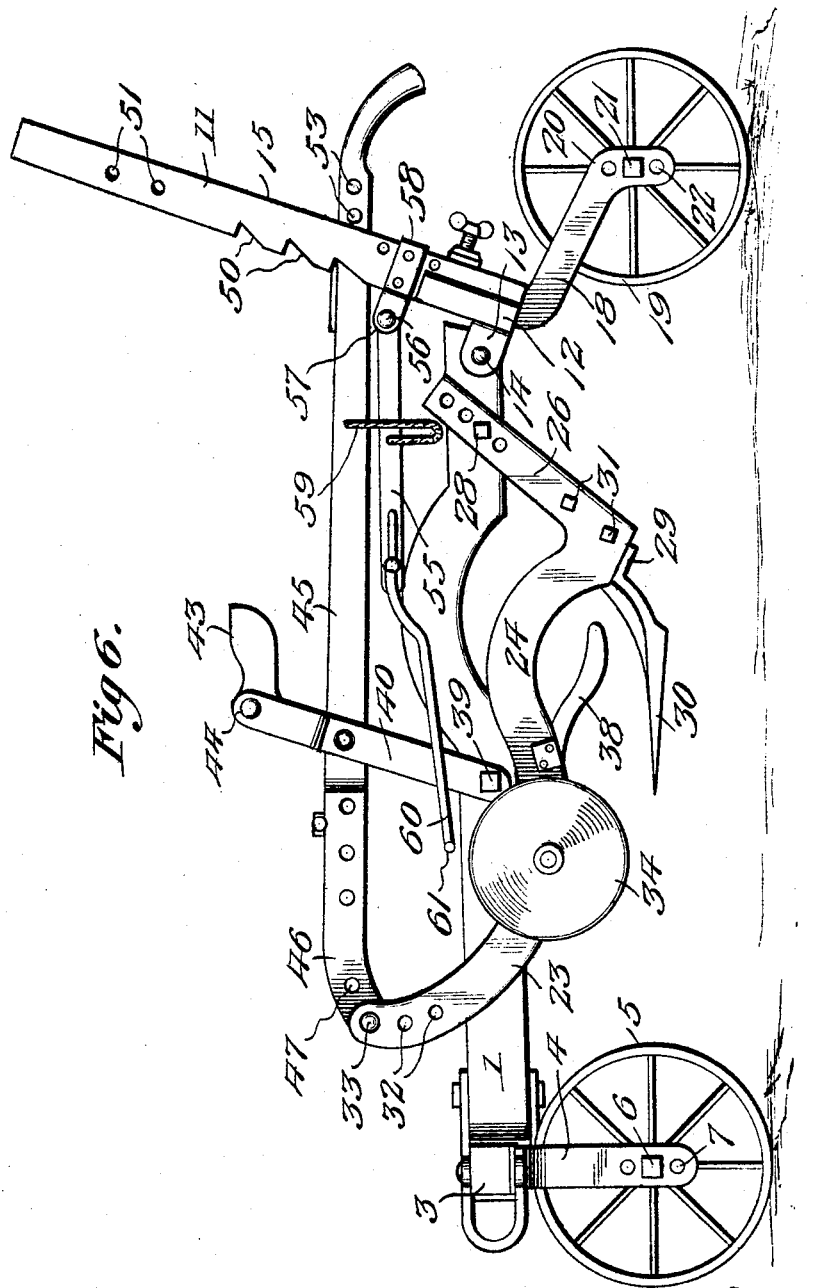

No. 795,709. PATENTED JULY 25, 1905.
L. J. KNIGHT.
PLOW.
APPLICATION FILED SEPT. 17, 1904.
3 SHEETS—SHEET 1.
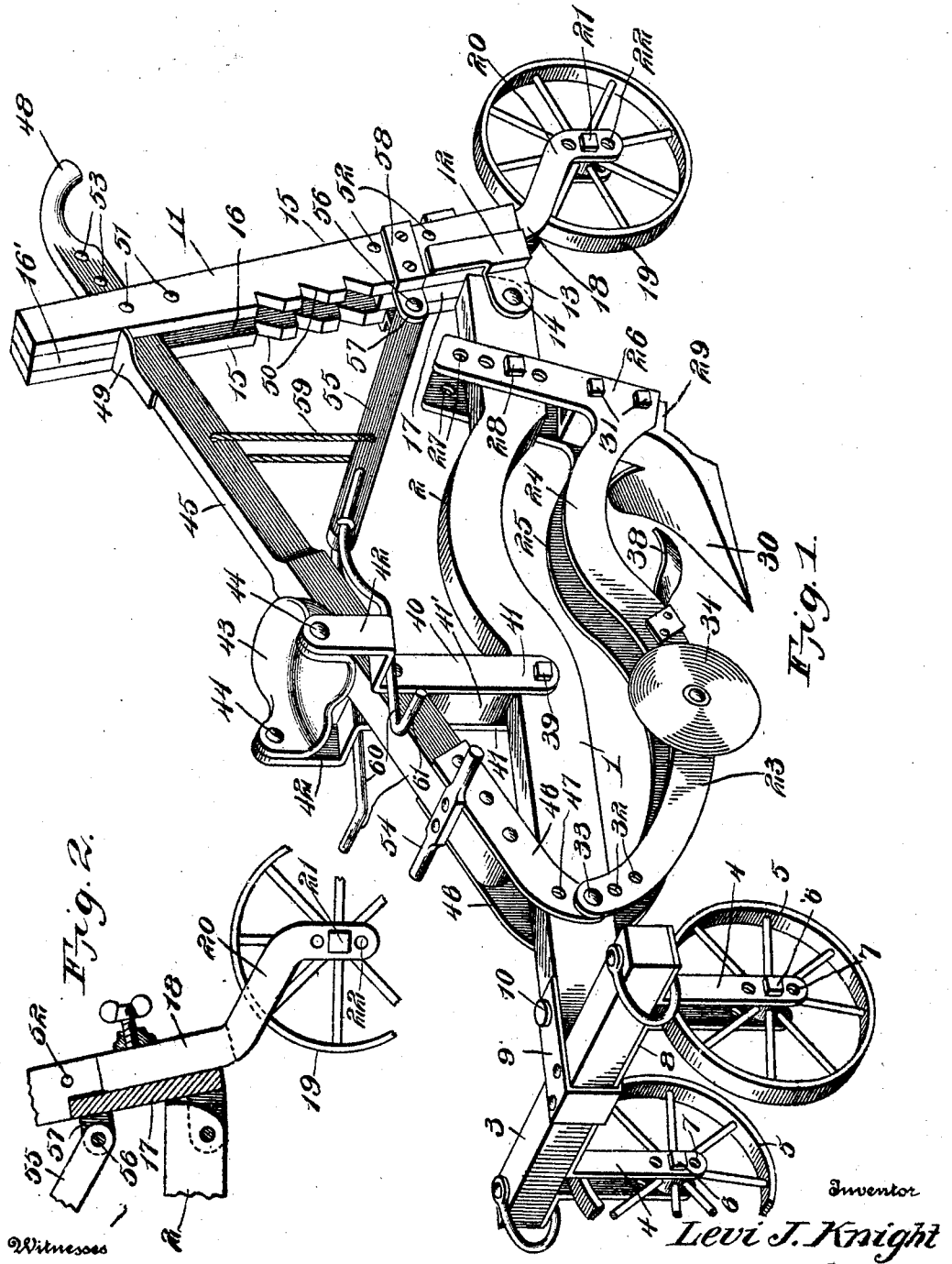

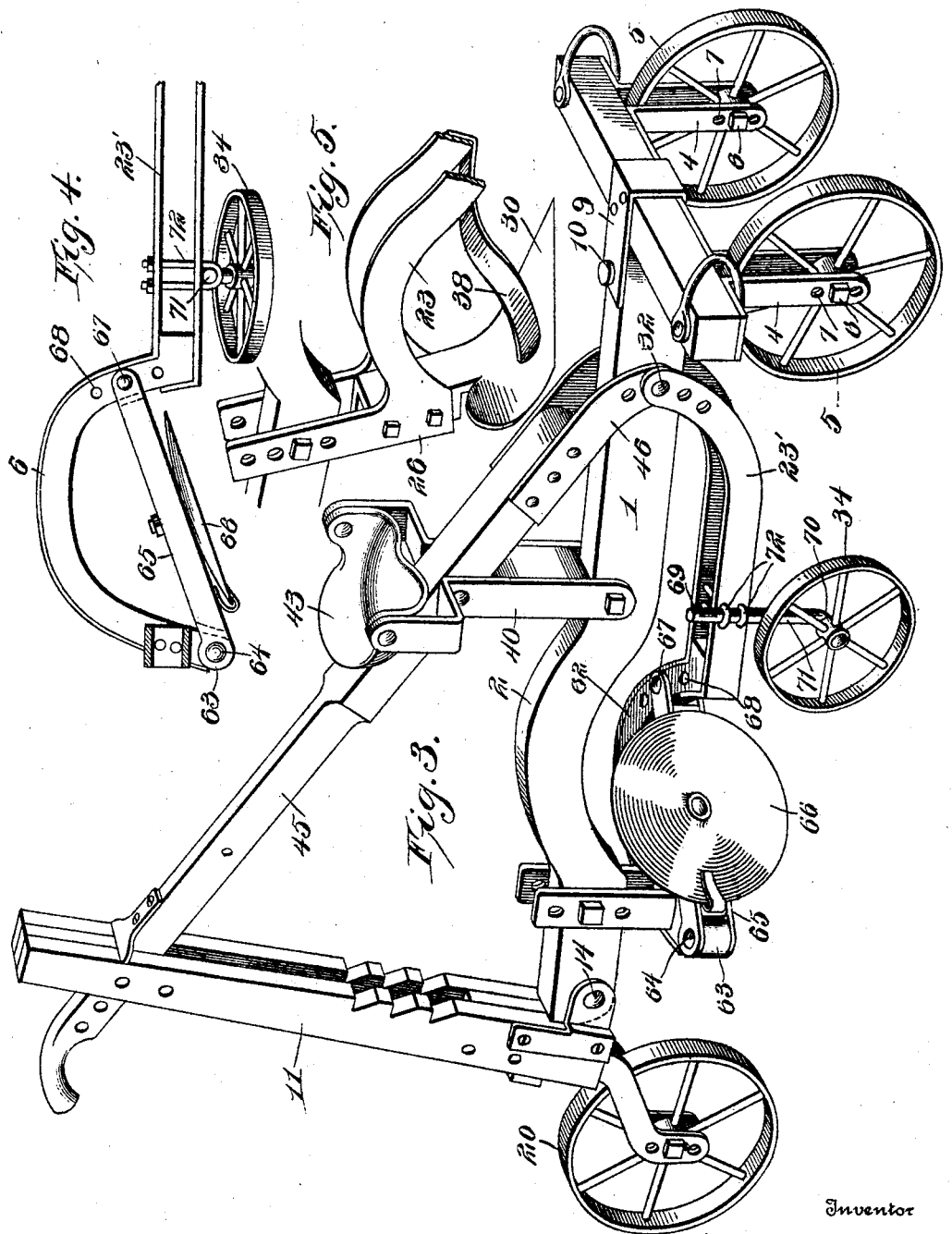

No. 795,709. PATENTED JULY 25, 1905.
L. J. KNIGHT.
PLOW.
APPLICATION FILED SEPT. 17, 1904.

3 SHEETS—SHEET 3.

Witnesses
Phil. C. Barnus.
C. C. Hines.

Inventor
Levi J. Knight
By Victor J. Evans.
Attorney

UNITED STATES PATENT OFFICE.

LEVI J. KNIGHT, OF BRAIDENTOWN, FLORIDA.

PLOW.

No. 795,709.  Specification of Letters Patent.  Patented July 25, 1905.

Application filed September 17, 1904. Serial No. 224,790.

*To all whom it may concern:*

Be it known that I, LEVI J. KNIGHT, a citizen of the United States, residing at Braidentown, in the county of Manatee and State of Florida, have invented new and useful Improvements in Plows, of which the following is a specification.

This invention relates to certain new and useful improvements in plows, and has for its object to provide a sulky-plow embodying improved features of construction whereby the plowshare, disk, or other implement in use may be quickly and conveniently raised and lowered and held in adjusted position and whereby the frame of the plow may also be adjusted to suit different conditions of service.

With this and other objects in view the invention consists of the features of construction, combination, and arrangement of parts hereinafter fully described and claimed, reference being had to the accompanying drawings, in which—

Figure 1 is a perspective view of a sulky-plow embodying my invention, showing the plowshare lowered for use. Fig. 2 is a vertical central section through the pivoted standard of the same, showing the means for securing the rear caster or supporting-wheel. Fig. 3 is a view similar to Fig. 1, showing the use of a disk plow instead of a shovel or share as disclosed in the construction shown in Fig. 1. Fig. 4 is a plan view showing the disk and its supporting parts, and Fig. 5 is a detail perspective view of a portion of the plow-frame, showing the plow and the relative position of the grass-sweep, this view showing the opposite side of the frame from that shown in Fig. 1. Fig. 6 is a side elevation showing the plowshare elevated to adapt the device for convenient transportation.

Referring now more particularly to the drawings, the numeral 1 represents the main frame-beam of the plow, which is provided at a point slightly in rear of its center with an arched portion 2 and is supported at its forward end by a wheeled frame comprising a draft-bar 3, provided with pendent hangers 4, arranged in pairs, disposed on opposite sides of the plane of the beam 1, and each pair carrying a supporting-wheel 5, arranged between the members thereof and mounted upon an axle-bolt 6, which bolt is adapted to pass through any one of a series of openings 7, formed in each of said hangers. The hangers may be provided at their upper ends with plates offset or arranged at an angle thereto and secured by suitable attaching means to the bar 3, and, if desired, the intermediate hangers may form integral portions of a connecting-plate 8, as shown in Fig. 1, which plate serves as a common medium for securing the same. The bar 3 is provided with a coupling member 9, having limbs projecting rearwardly therefrom and overlapping the upper and lower surfaces of the forward end of the beam 1 and having passing therethrough a bolt 10, which pivotally connects the coupling to the beam and allows the bar 3 to have a swinging movement for steering purposes. The front edges of the beam 1 are rounded off to permit such swinging movement. Either one of the wheels 5 may follow the furrow accordingly as the plow throws the earth to the left or right, and the series of openings 7 permit it to be lowered for this purpose.

At the rear end of the beam 1 is arranged a standard 11, which projects above the same and is pivotally attached at its lower end thereto, the pivotal connection employed being shown in the present instance in the form of bracket-plates 12, suitably fixed to the lower end of said standard and having angularly-bent forwardly-projecting check-pieces 13, embracing the rear end of the beam 1 and pivotally attached thereto by a connecting-bolt 14. The standard consists of spaced pieces 15, forming an intervening longitudinal slot 16, said pieces being connected at their upper and lower ends by interposed distance blocks or pieces 16' and 17 and suitable fastenings. The lower block 17 is of restricted size and so arranged that it closes only the forward portion of the lower end of the slot 15, leaving a space at the rear thereof for the reception of the axle or stem 18 of the supporting-frame of a trailing wheel 19, which supports the rear portion of the frame of the plow. The axle or stem 18 terminates at its lower end in fork-arms 20, between which the wheel 19 is arranged and pivotally mounted upon a bolt or axle 21, which is adapted to be passed through any one of a series of openings 22, arranged in coincident relation in the lower ends of the fork-arms to enable the rear portion of the frame to be supported at the desired elevation.

The plowshare or other implement to be employed for breaking or cultivating purposes is carried by a frame or beam 23, composed of two S-shaped or compound curved members 24 and 25, provided at their rear ends with upwardly-projecting extensions 26, forming hangers or standards, the upper ends of which are provided with series of openings 27 for the passage of a bolt 28, pivotally connecting them to the beam 1 in rear of the arched portion 2. The lower ends of these standards 26 receive between them the shank or attaching portion 29 of the plowshare or shovel 30, which shank may be fastened thereto by suitable securing screws, bolts, or analogous fastenings 31. The rear upwardly-curved portions of the members 24 and 25 of the beam are disposed beneath the arched portion of the frame-beam 1 and form an elevated support for the implement 30, which extends beneath the same, while the forwardly upwardly curved portions of said members 24 and 25 are provided with series of openings 32 for the passage of bolts 33 or other fastenings, pivotally securing the same to an adjusting-lever, hereinafter described. Member 24 of the plow frame or beam 23 carries a colter wheel or disk 34, which cuts the sod in advance of the plow. The beam 23 may also carry a blade or strip 38, projecting laterally at a suitable angle thereto in advance of the moldboard of the plow to turn down the grass, weeds, and other obstructions in front of the plow into the furrow previously formed.

Passing through the beam 1 at the forward end of the arched portion 2 is a transverse bolt 39, upon which a fulcrum-frame 40 is pivotally mounted, said frame consisting of vertically-arranged standards 41 and an interposed filler-block 41', each of said standards being provided at its upper end with an outwardly and upwardly bent portion 42, the two portions 42 being oppositely arranged and forming a yoke to receive and support a driver's seat 43, pivotally mounted upon the vertical members of said angularly-bent extensions by pivot studs or bolts 44. This pivotal connection of the seat 43 adapts the same to be always brought to lie in a horizontal plane notwithstanding what position the fulcrum-frame or the adjusting-lever, hereinafter described, may occupy at the different periods in the adjusting of the parts to vary the position of the share or operating implement 30.

An adjusting beam or lever 45 extends through the standards 41 of the fulcrum-frame 40 and is provided at its forward end with metallic plates 46, which overlap the front portion of the beam 1 and are provided with openings 47 to receive the bolts 33, which pivotally connect the lever to the forward end of the plow frame or beam 23. The rear portion of the lever 45 projects through and is adapted to slide vertically in the slot 16 of the standard 11 and is provided at its rear end with a suitable form of handle 48 to enable it to be raised and lowered by hand when desired. The lever 45 carries a plate 49, having laterally-extending portions and forming a pawl to engage notches 50 in the forward edges of the members of the standard 12 to lock the lever to the standard when adjusted to elevate the share or cutting implement 30 a greater or less distance above the surface of the ground. In the standard 11 are openings 51 52, arranged, respectively, above and below the series of notches 50 and adapted to receive pins or bolts which may be employed to support the lever 45 when necessary to adjust the same above or below said notches and to hold the lever depressed when occasion requires. The rear end of the lever 51 is also provided with openings 53 to receive bolts for fastening a pair of supports or handles thereto to enable the implement to be used as a walking-plow under certain conditions—as, for instance, when a single wheel is substituted for the pair of wheels at the front of the beam 1 and it is necessary to guide the implement in its path of travel across the field. The forward portion of the lever 45 is provided in advance of the seat-frame with a cross-bar having projecting terminals forming foot-rests 54.

By the construction of the parts thus far described it will be seen that when the beam 45 is rocked upon its fulcrum to raise or lower it motion will be imparted to the standard 11 at the rear and to the plow-beam 23 to raise and lower the latter, thus enabling the share or implement 30 to be forced to the desired depth into the ground or to be raised a greater or less elevation above the same, and that when the rear end of the lever 45 is depressed to elevate the share 30 the parts may be secured or locked in their adjusted position by the engagement of the pawl 49 with one of the sets of notches or recesses 50 in the standard 11, thus adapting the parts to be conveniently thrown into and out of operation. It will be observed that the openings 27 permit the plow-standard at the rear of the plow-beam to be vertically adjusted to pivot at different points, while the openings 32 permit corresponding adjustment of the pivotal connection between the plow-beam and adjusting-lever. The plow may also be adjusted to regulate its depth of penetration of the soil by raising or lowering the front end of the plow-beam, which may be held in adjusted position by the use of a pin or bolt (not shown) passing through the openings 32 and resting on the beam 1.

When the device is used as a sulky-plow, it is desirable to provide some means to enable the driver to operate the lever 45 from his position on the seat 33. To this end I provide a swinging bar 55, which is pivotally attached at its rear end by a bolt 56 to ears 57 upon a collar 58, fastened to the standard 11, and thence extends upwardly in inclined relation to the standard and lever and is suspended from the latter by a rope or other suitable connection 59. From the forward end of the bar 55 extend arms 60, which diverge and pass beneath the horizontal portions of the bent or angular upper ends 42 of the standards 41 of the fulcrum-frame and are provided in advance of said frame with handles 61, which are so disposed as to be conveniently depressed by the rider occupying the seat 43.

By forcibly pressing down upon the handles 61 the bar 55 will be forced downward and, through the connection 59, will draw upon the rear end of the beam 45, thus forcing it downward in the slot 16 of the standard 11 and raising the plow-beam in the manner previously described to lift the plow 30 to the desired elevation. Upon releasing the handles 61 the weight of the beam 23 and attached parts will restore the several elements to their normal position by gravity.

When it is desired to use a disk in place of the shovel or share 30, a modified form of plow-beam may be applied in the manner shown in Figs. 3 and 4, from which it will be seen that the beam 23' is laterally offset at its rear end to form a U-shaped or substantially semicircular portion 62, which is provided at its rear end with a sleeve or knuckle 63, through which passes a pintle 64, forming the pivotal connection for one end of a supporting bar or frame 65, carrying the furrow-forming disk 66, the opposite end of which bar or frame is apertured for the passage of a bolt 67, adapted to engage any one of a series of openings 68 in the part 62 of the beam to enable the disk to be adjusted at a greater or less angle to the line of draft to form furrows of different widths. A staggered furrow-wheel 34 may be attached to the beam 23' in advance of the disk 66, as shown in Fig. 3, to run in the furrow previously formed by said disk and maintain the plow in its proper path of movement. This furrow-wheel may be mounted in any approved manner, but as shown is carried by a support 69, having a horizontal axle 70, on which the wheel is journaled, and an upwardly-extending stem 71, attached to the beam 23' by clips 72.

From the foregoing description, taken in connection with the accompanying drawings, the construction and mode of operation of the invention will be readily understood, and it will be seen that the invention provides simple and effective means which will enable the operator to conveniently adjust the plow or cultivating implement as occasion may require in use and to throw the same into and out of operation.

Changes in the form, proportions, and minor details of construction may be made within the scope of the invention without departing from the spirit or sacrificing any of the advantages thereof.

Having thus described the invention, what is claimed as new is—

1. In an implement of the character described, the combination with a main frame-beam, of an implement-carrying beam pivotally connected thereto, a standard pivotally connected to and rising from the rear portion of the main frame-beam, and an adjusting-lever pivotally connected to the said main frame-beam and implement-carrying beam and guided by said standard and provided with means for engaging the standard to hold the implement-carrying beam in adjusted position.

2. In an implement of the character described, the combination of a main frame-beam, an implement-carrying beam pivoted at its rear end thereto, a standard pivoted to the rear portion of the main frame-beam, a lever guided by said standard and adjustably connected therewith and pivoted intermediately to the main frame-beam and at its forward end to the implement-carrying beam, and means for operating said lever to adjust the implement-carrying beam and to hold it in fixed relation to the standard.

3. In an implement of the character described, the combination with a main frame-beam having an arched portion, of an implement-carrying beam having an arched portion below the arched portion of the main beam, upward extensions at its rear end pivoted to the main frame-beam and upwardly-curved forward ends, and an adjusting-lever pivoted to the main frame-beam and to the said upwardly-curved forward ends of the implement-carrying beam.

4. In an implement of the character described, the combination of a main frame-beam, an implement-carrying beam pivotally connected thereto, a standard pivotally connected to the rear end of the main frame-beam, a lever adjustably connected with said standard and pivotally connected to the main frame-beam and implement-carrying beam, an operating element pivoted to the standard, and a connection between said element and the lever, substantially as described.

5. In an implement of the character described, the combination of a main frame-beam, an implement-carrying beam pivoted thereto, a fulcrum-frame rising from the main frame-beam, a standard pivotally connected to the rear portion of the main frame-beam, and an adjusting-lever pivotally connected to the fulcrum-frame and implement-carrying beam and adjustably connected with the standard.

6. In an implement of the character described, the combination of a main frame-beam, an implement-carrying beam pivoted thereto, a standard pivotally connected to the rear portion of the main frame-beam, a fulcrum-frame pivoted to the main frame-beam and rising therefrom, a lever having a pivotal connection with the fulcrum-frame, and an adjustable connection with the standard, and means connected with the standard and lever and adapted to be operated by the operator from the fulcrum-frame to effect the adjustment of the implement-carrying beam, substantially as described.

7. In an implement of the character described, the combination of a main frame-beam, an implement-carrying beam pivotally mounted thereon, a tilting wheeled support for the rear end of the main frame-beam, a standard connected thereto, and a lever pivotally connected to the main frame-beam and implement-carrying beam and adjustably connected to the standard.

8. In an implement of the character described, the combination with a main frame-beam, and means for elevating the same, of an implement-carrying beam comprising a compound curved portion provided with upward extensions for the attachment of an implement thereto, said upward extensions being pivotally connected to the beam and means for adjusting said implement-carrying beam on its pivotal connection, substantially as described.

9. In an implement of the character described, the combination of a main frame-beam, a standard pivotally mounted upon the rear end of said beam, a tilting support for said standard, an implement-carrying beam pivoted to the main frame-beam, and a lever pivoted to the main frame-beam and implement-carrying beam and adjustably connected with the standard.

10. In an implement of the character described, the combination of a main frame-beam, a fulcrum-frame pivoted thereto and rising therefrom, an implement-carrying beam pivoted to the main frame-beam and adapted to be adjusted upon a tilting movement thereof, a tilting support for the rear end of the main frame-beam, a standard pivoted to the rear end of the main frame-beam and rising therefrom, a lever pivoted to the main frame-beam and fulcrum-frame and adjustably connected with said standard, a swinging bar pivoted to the standard, and connected with said lever, and means carried by said bar and disposed in proximity to the fulcrum-frame to effect the adjustment of said lever, substantially as described.

11. In an implement of the character described, the combination of a main frame-beam, a tilting support for the rear end thereof, a standard connected with said support and pivoted to the rear end of the beam, a lever pivoted to the beam and adjustably connected with said standard whereby the latter may be operated to tilt the beam, and an implement-supporting beam carried by the main frame-beam and adapted to be adjusted by a tilting movement thereof, substantially as described.

12. In an implement of the character described, the combination of a main frame-beam, a wheeled support for the forward end of the beam, a tilting support for the rear end of the beam, a standard forming part of said tilting support, an implement-carrying beam carried by the main frame-beam and adapted to be adjusted by a tilting movement of the latter, a fulcrum-frame rising from the main frame-beam and pivoted thereto, a lever pivoted to the main frame-beam and fulcrum-frame and adjustably connected with the standard, means supported by the standard and connected with the lever for operating the latter, and mechanism for operating said means and disposed in proximity to the fulcrum-frame, substantially as described.

13. In an implement of the class described, a main frame-beam, an implement-carrying beam pivoted at its rear end to the main frame-beam, a standard pivoted to and rising from the rear end of the main frame-beam, an adjusting-lever pivoted to the main frame-beam and to the forward end of the implement-carrying beam, said lever being held in guided connection with the standard, and means for locking it at various points of adjustment on the standard.

14. In an implement of the character described, a main frame-beam, an implement-carrying beam pivoted at its rear end to the main frame-beam, a standard pivoted to the rear end of the main frame-beam and rising therefrom, a lever pivoted to the main frame-beam and implement-carrying beam and adjustably connected to said standard, and means for adjusting said lever from a point in front or in rear of the standard.

In testimony whereof I affix my signature in presence of two witnesses.

LEVI J. KNIGHT.

Witnesses:
C. C. HINES,
E. G. McKEE.